(12) United States Patent
Hussain et al.

(10) Patent No.: US 10,392,568 B2
(45) Date of Patent: Aug. 27, 2019

(54) SEQUENTIAL MIXING SYSTEM FOR IMPROVED DESALTING

(71) Applicant: PHILLIPS 66 COMPANY, Houston, TX (US)

(72) Inventors: Mohammed Hussain, Bartlesville, OK (US); Moniraj Ghosh, Bartlesville, OK (US); Keith H. Lawson, Bartlesville, OK (US); Vikram Singh, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 273 days.

(21) Appl. No.: 14/924,104

(22) Filed: Oct. 27, 2015

(65) Prior Publication Data

US 2016/0046877 A1 Feb. 18, 2016

Related U.S. Application Data

(63) Continuation-in-part of application No. 14/470,465, filed on Aug. 27, 2014, and a continuation-in-part of
(Continued)

(51) Int. Cl.
 *B01D 17/04* (2006.01)
 *B01D 17/06* (2006.01)
 (Continued)

(52) U.S. Cl.
 CPC .............. *C10G 33/02* (2013.01); *B01D 17/04* (2013.01); *B01D 17/042* (2013.01);
 (Continued)

(58) Field of Classification Search
 CPC ........ C10G 31/00; C10G 31/06; C10G 31/08; C10G 33/02; C10G 33/04; C10G 33/06;
 (Continued)

(56) References Cited

U.S. PATENT DOCUMENTS 2,446,040 A 7/1948 Blaire, Jr.
3,582,489 A 6/1971 Meadow et al.
(Continued)

OTHER PUBLICATIONS

PCT Notification of Transmittal of the International Search Report and the Written Opinion of the International Search Authority, or the Declaration, International Application No. PCT/US2014/063680; International Filing Date: Nov. 3, 2014, 15 pages.
(Continued)

*Primary Examiner* — Benjamin L Lebron
(74) *Attorney, Agent, or Firm* — Phillips 66 Company

(57) ABSTRACT

A system for desalting crude oil includes delivering a stream of salty crude oil and wash water into a mixing valve, mixing the stream of salty crude oil and wash water through the mixing valve to create a mixed stream of desalted crude oil and salty wash water, delivering the mixed stream of desalted crude oil and salty wash water to a static mixer, and mixing the mixed stream of crude oil and wash water in the static mixer. Within the static mixer, the mixed stream is mixed in a coalescing regime to coalesce smaller droplets of water into larger droplets of water. The mixed stream is subjected to an electric field to cause additional coalescence before being directed to a desalter where the salty wash water is separated from the desalted crude oil.

11 Claims, 12 Drawing Sheets

Related U.S. Application Data application No. 14/470,502, filed on Aug. 27, 2014, now abandoned.

(60) Provisional application No. 61/908,823, filed on Nov. 26, 2013.

(51) Int. Cl.

| | | |
|---|---|---|
| *B01F 5/06* | (2006.01) | |
| *B03C 5/02* | (2006.01) | |
| *C02F 1/48* | (2006.01) | |
| *C10G 31/08* | (2006.01) | |
| *C10G 32/02* | (2006.01) | |
| *C10G 33/02* | (2006.01) | |
| *C02F 101/32* | (2006.01) | |

(52) U.S. Cl.
CPC ........... *B01D 17/045* (2013.01); *B01D 17/06* (2013.01); *B01F 5/061* (2013.01); *B01F 5/0602* (2013.01); *B01F 5/064* (2013.01); *B01F 5/0615* (2013.01); *B01F 5/0646* (2013.01); *B03C 5/02* (2013.01); *C02F 1/48* (2013.01); *C10G 31/08* (2013.01); *C10G 32/02* (2013.01); *B03C 2201/02* (2013.01); *C02F 2101/325* (2013.01); *C10G 2300/805* (2013.01)

(58) Field of Classification Search
CPC .............. C10G 2300/805; B01D 11/02; B01D 11/0211; B01D 11/0288; B01D 17/02; B01D 17/0208; B01D 17/0214; B01D 17/06; B01D 21/009; B01D 21/24; B01D 21/2405; B01D 17/04; B01D 17/042; B01D 17/045; B01F 5/00; B01F 5/0061; B01F 5/06; B01F 2005/0017; B01F 2005/002; B01F 2005/0088; B01F 2005/0094; B01F 5/0602; B01F 5/061; B01F 5/0615; B01F 5/064; B01F 5/0646; B03C 5/02; B03C 2201/02; C02F 1/48; C02F 2101/325; G10G 32/02; G10G 33/02

See application file for complete search history.

(56) References Cited

U.S. PATENT DOCUMENTS

| | | | |
|---|---|---|---|
| 3,664,638 A | 5/1972 | Grout et al. | |
| 4,417,971 A * | 11/1983 | Ferrin | B01D 17/06 204/663 |
| 4,466,741 A | 8/1984 | Kojima | |
| 4,938,876 A | 7/1990 | Ohsol | |
| 2004/0094421 A1* | 5/2004 | Sams | B01D 17/00 204/554 |
| 2008/0149486 A1 | 6/2008 | Greaney et al. | |
| 2008/0251421 A1 | 10/2008 | Liverud et al. | |
| 2009/0242384 A1* | 10/2009 | Curcio | B01F 3/088 204/168 |
| 2009/0300973 A1* | 12/2009 | Ashley | B01J 19/2405 44/308 |
| 2011/0172473 A1* | 7/2011 | Nguyen | B01D 17/0217 585/3 |
| 2012/0024758 A1 | 2/2012 | Love | |
| 2014/0339089 A1* | 11/2014 | Tienhaaraa | C02F 1/46104 204/573 |

OTHER PUBLICATIONS

PCT Notification of Transmittal of the International Search Report and the Written Opinion of the International Search Authority or the Declaration, International Application No. PCT/US2014/63685, International Filing Date: Nov. 3, 2014, 13 pages.

* cited by examiner

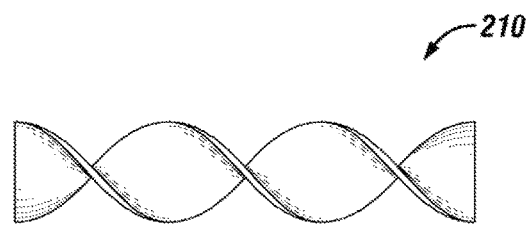
FIG. 4
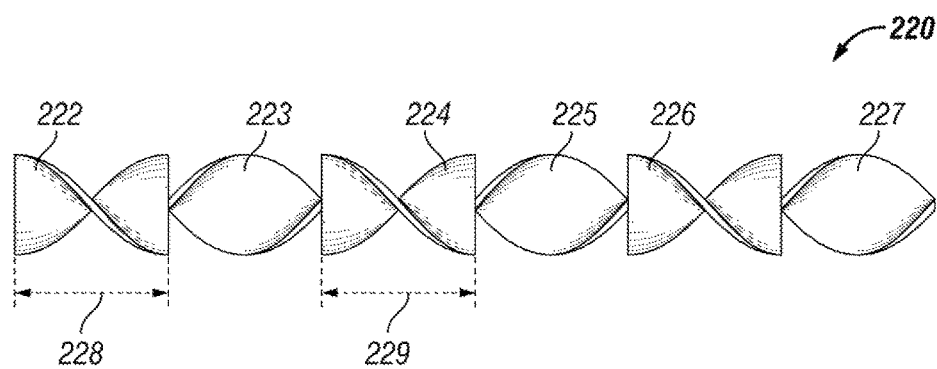
FIG. 5
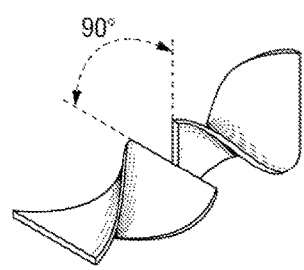 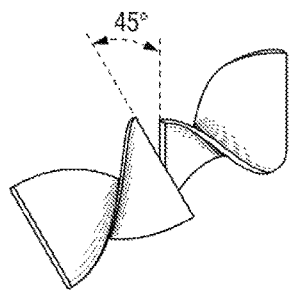
FIG. 6　　　　　　　FIG. 7

SEQUENTIAL MIXING SYSTEM FOR IMPROVED DESALTING

CROSS-REFERENCE TO RELATED APPLICATIONS

This application is a non-provisional continuation-in-part application of U.S. Ser. No. 14/470,465, filed Aug. 27, 2014, entitled "SEQUENTIAL MIXING SYSTEM FOR IMPROVED DESALTING" and U.S. Ser. No. 14/470,502, filed Aug. 27, 2014, entitled "SEQUENTIAL MIXING PROCESS FOR IMPROVED DESALTING", both of which claim benefit under 35 USC § 119(e) to U.S. Provisional Application Ser. No. 61/908,823 filed Nov. 26, 2013, entitled "SEQUENTIAL MIXING FOR IMPROVED DESALTING," all of which are incorporated herein in their entirety.

STATEMENT REGARDING FEDERALLY SPONSORED RESEARCH OR DEVELOPMENT

None.

FIELD OF THE INVENTION

This invention relates to desalting crude oil and more particularly to mixing crude oil and water and the subsequent separation of the water from the crude oil carrying away much of the original salt in the crude oil.

BACKGROUND OF THE INVENTION

Raw crude oil generally contains salts, such as calcium, sodium and magnesium chlorides. Salts cause corrosion in refinery systems that are expensive to repair and require more frequent shutdown and longer turn-around before profitable operation resumes. Corrosion is caused primarily by hydrochloric acid (produced from the hydrolysis of salts at high temperatures) in crude oil distillation columns and overhead systems. Since salts in crude oils are a significant problem and concern, removing such salts is an important operational process in a refinery.

Typically, desalting crude oil involves adding water to the incoming crude oil emulsifying the water and oil by shearing across a globe valve, which is also known as a mix-valve and allowing the oil and water to separate in a desalter settling vessel. The salt preferentially and fairly rapidly dissolves into the water immediately following the mix-valve so the remaining step is to separate the water from the oil. The oil and water are separated based on their density differences. Desalted crude exits from the top of the desalter settling vessel to the crude distillation tower while effluent water or brine exits from the bottom. However, desalting heavy crude oil in a refinery desalter system is challenge due to relatively high viscosity of heavy crude and relatively high densities of heavy crude oil relative to the water that captures the salt and is then separated from the crude oil based on density differences. Moreover, water and oil emulsions for heavy crude oil tend to be more stable than for light oil and stable emulsions make desalting less successful or at least more difficult.

In a typical desalting process, raw crude oil containing salt is mixed with water and raises the water content to a range of about 3% to 10%. The mixing of the oil phase and the water phase is carried out using a single mix valve which creates the water and oil emulsion. With other process parameters remaining similar, the pressure drop across the mix valve determines the size of the water droplets in the emulsion. Poor mixing across the mix valve allows salt to carry-over with the crude and over-mixing results in the formation of a stable emulsion which is difficult to break in the refinery desalter.

Within the desalter settling vessel, water droplets undergo coalescence under the influence of electrical and gravitational fields. In a traditional desalter, large water droplets settle down to the bottom of the desalter tank whereas smaller drops have a low settling velocity and tend to become entrained with the crude oil and exit the desalter into a stream that is a hazard to refinery systems as described above. The size of the droplets which actually settle downward within the desalter can be estimated based on the centerline velocity of the crude oil.

For those that have studied and designed desalting systems, desalting efficiency is generally defined in Equation (1) as:

$$\text{Desalting Efficiency (\%)} = (\text{Salt In} - \text{Salt Out})/\text{Salt In} \times 100 \qquad \text{Equation (1)}$$

Desalting efficiency may be described as the product of the mixing efficiency and the dehydration efficiency. "Salt In" may be described as the salt content of the incoming oil, and "Salt Out" may be described as the salt content of the exiting oil. The mixing efficiency, while not commonly measured, is the percentage of salt transferred to the bulk water phase. The dehydration efficiency is described in Equation (2) as:

$$\text{Dehydration Efficiency (\%)} = (\text{Water In} - \text{Water Out})/\text{Water In} \times 100 \qquad \text{Equation (2)}$$

"Water In" is the combined contribution of added water and the inlet percent of basic sediments and water ("% BS&W") in raw crude oil. "Water Out" may be described as the percent of basic sediments and water ("% BS&W") in desalted crude oil.

Due to constantly changing operating conditions, operation of the mixing valve is often constrained by the rate of water separation in desalter vessel. Excessive pressure drop across mixing valve promotes mixing and salt transfer, but such intense mixing creates an emulsion with relatively smaller average water drop size. Such an emulsion is difficult to break and separate and it lowers the dehydration efficiency.

Dehydration (water separation) in a desalter depends on the net velocity ("$U_{Net}$") of water drops is given in Equation (3) as:

$$U_{Net} = (r^2 \times (\rho_w - \rho_o) \times g/3\mu_o) - (Q_o/(L \times D)) \qquad \text{Equation (3)}$$

The second term on the right-hand side "$Q_o/(L \times D)$" is the settling velocity of a water drop of radius "r", viscosity "$\mu_o$," and density "$\rho_w$" in oil of density "$\rho_o$" and viscosity "$\mu_o$." The pre-factor of one-third (⅓) is appropriate for a viscous water drop as opposed to a rigid spherical particle. The second term is (approximately) the centerline velocity arising from the upward oil flow ($Q_o$) in the desalter of diameter D and length L. Simply put, factors that increase the net positive (i.e. downward) velocity of the water drops improve dehydration in a desalter.

The ratio of the water oil density differential to oil phase viscosity (($\rho_w - \rho_o)/\mu_o$), which is referred to as Stokes' parameter, depends on the water, crude oil, and operating temperature, whereas the drop size, r, is a function of the shear rate and flow geometry at the mixing valve (and subsequent pipe and fittings) and the water-oil interfacial properties.

There is a difficult trade-off between high shear which captures more salt in the water but allows more of the water to go into the refinery and low shear which prevents water from passing along into the refinery, but captures less of the salt in the crude. Adding to this challenge, the viscosity of the heavier crude oils tends to slow the settling velocity of all water droplets. The density difference between water and heavy crude oil is less than lighter crude oils further slowing settling velocity. Thus, as the worlds' production of crude oils tends to get heavier and denser, refineries will need to deal with the challenges within the desalters.

What is needed then are improved methods, processes and apparatuses to improve desalting of crude oil in an oil refinery.

BRIEF SUMMARY OF THE DISCLOSURE

The invention more particularly relates to a process for desalting crude oil where a stream is delivered into a mixing valve wherein the stream comprises wash water and crude oil having salt in the crude oil and the stream of crude oil and wash water is mixed in the mixing valve to create a mixed stream of crude oil and wash water wherein the mixing of the crude oil with the wash water causes the wash water to capture salt from the crude oil to thereby creating desalted crude oil and salty wash water. The mixed stream of crude oil and wash water is delivered from the mixing valve to a coalescer mixer where the mixed stream of crude oil and wash water is mixed in the coalescer mixer. The salty wash water is then separated from the desalted crude oil.

The invention may also be described as a process for desalting crude oil where a stream of crude oil and a stream of wash water is delivered into a mixing valve and mixed to create a mixed stream of crude oil and wash water with a plurality of water droplets having a first average droplet size. The mixed stream of crude oil and wash water is further mixed in a coalescer mixer to form a coalesced stream of crude oil and wash water wherein water in the coalesced stream has a second average droplet size that is larger than the first average droplet size and the salty wash water is then separated from the desalted crude oil.

BRIEF DESCRIPTION OF THE DRAWINGS

A more complete understanding of the present invention and benefits thereof may be acquired by referring to the following description taken in conjunction with the accompanying drawings in which:

FIG. 4 shows a helical coalescer blade for coalescing according to the present invention;

FIG. 5 shows a segmented helical mixer blade for coalescing according to the present invention;

FIG. 6 shows a segmented helical mixer blade with a 90 degree offset between two successive mixing elements for coalescing according to the present invention;

FIG. 7 shows a segmented helical mixer blade a 45 degree offset between two successive mixing elements for coalescing according to the present invention;

DETAILED DESCRIPTION

Turning now to FIGS. 1-19 and the detailed description of preferred arrangements of the disclosure, it should be understood that the inventive features and concepts may be manifested in other arrangements and that the scope of the invention is not limited to the embodiments described or illustrated. The scope of the invention is intended only to be limited by the scope of the claims that follow.

Figure 1:
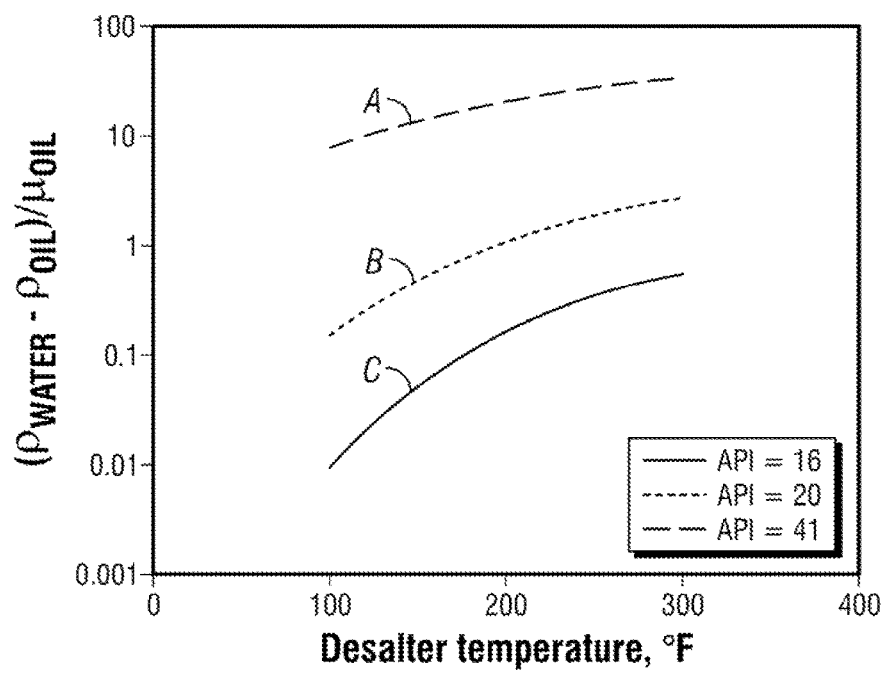
FIG. 1 graph depicting plots of variations of Stokes' parameter (the density difference between oil and water divided by the viscosity of oil) as a function of temperature for a variety of crude oils.

FIG. 1 provides insight into the challenges of desalting heavier crudes. Desalting of crude is accomplished by exposing wash water to the salt bearing crude with high contact area typically by creating a large number of very small water droplets. The salt is fairly rapidly dissolved in the water. Thus, the second challenge is to then remove the water from the crude. In conventional desalting systems, water is separated from crude in large settling vessels where gravitational force causes heavier water to separate or settle to the bottom. The settling rate may be generally estimated based on the density differences between the water and oil along with the viscosity of the crude. However, heavier crudes have a smaller density difference relative to water as compared to the density difference of conventional light crudes with water. Small density differences reduce separation efficiency. Heavier crudes are also more viscous. Higher viscosity is also a penalty for easy separation. As shown in FIG. 1, heating the mixture tends to reduce the viscosity, but consider that the vertical scale at the left of the diagram is logarithmic. Line A shows separation forces for a light crude having an API gravity of 41. Line B shows separation forces for a heavier crude having an API gravity of 20. At an API gravity of just four units heavier at 16, the crude oil is still startling more challenging to separate from water as shown at line C. It appears that heavier crudes will simply require a lot more residence time in the settling tank to separate water from the crude.

Figure 2:
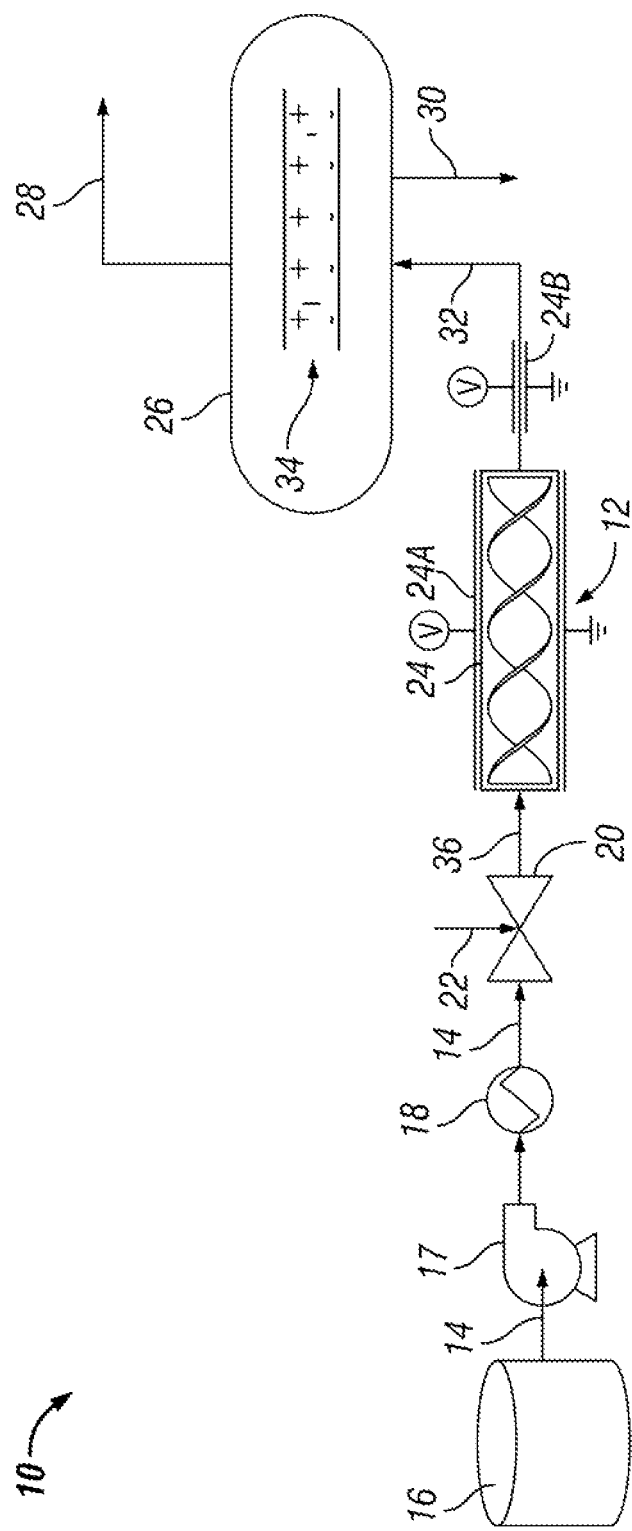
FIG. 2 is a schematic diagram of one embodiment of a crude oil desalting apparatus in accordance with the present invention.

FIG. 2 depicts a schematic diagram of a crude oil desalting apparatus 10 according to the present invention, including a sequential mixing arrangement 12 to improve both salt transfer and dehydration. Crude oil desalting apparatus 10 receives crude oil from a crude oil storage container 16 which flows into and through a heat exchanger 18 to transfer heat into crude oil 14. From heat exchanger 18, crude oil in conduit 14 flows into mix valve 20 where it is mixed with wash water 22 in mixing valve 20. In some arrangements, the wash water is supplied further upstream of the mixing valve 20 (such as before the heat exchanger or before the crude charge pump) as will be shown in FIG. 3. The mixing valve 20 is typically a globe valve, but a valve that creates adjustable shear forces on the fluid passing through will likely work.

The present invention particularly includes a coalescer mixer 24 that is in addition to the mixing valve 20. The mixing valve 20 provides high shear to the oil and water mixture dividing up the water droplets into numerous small droplets that adsorb the salt and other contaminants in the oil and the coalescer mixer 24, which may be a static mixer, agitates the water droplets, but also causes coalescence of the droplets into larger droplets. To enhance the coalescence of the droplets, the oil and water mixture is subjected to an electric field. The electric field may be applied to the oil/water mixture while in the coalescer mixer or in the conduit either before or after the coalescer mixer or any combination thereof. In FIG. 2, the electric field is created by field generators 24A and 24B. Each of the field generators 24A and 24B comprise a voltage source connected to a first plate and a second plate positioned generally on the opposite side of the oil water mixture from the first plate where the second plate is grounded. The first field generator 24A is positioned to create an electric field for the oil/water mixture while in the coalescer mixer 24 and the second field generator 24B is positioned to create an electric field for the oil/water mixture in the conduit immediately following the coalescer mixer 24. The field generators 24A and 24B preferably apply a field that causes the water droplets to move in a way that is likely to increase the number of collisions with other water droplets. The field strength should be powered so as to optimize the frequency and force of the collisions and increase the coalescence of the droplets. High velocity impacts break droplets into smaller droplets. The coalescer mixer is designed to also create turbulence to cause gentle impacts that lead to coalescence of droplets and the two technologies working together have a synergistic effect.

The mixing valve 20 and the coalescer mixer 24 are together referred to as a sequential mixing arrangement as each of mixing valve 20 and coalescer mixer 24 perform separate and distinct mixing steps before the crude oil and water mixture in desalter conduit 32 flow onward and into a desalter vessel 26. In the desalter vessel 26, the large space with small incremental velocity allows for the salt water and crude oil to separate based on their density differences. Unlike the mixing valve, shear forces are either absent or too weak to break up the water droplets. Electric grids 34 produce dipolar attraction between the polar water droplets. This causes the smaller drops to grow bigger by collision and coalescence. Larger water droplets descend faster in the desalter vessel 26 such that desalted or lower salt content crude oil can be withdrawn from the overhead conduit 28. Salty water drains from the desalter vessel 26 through drain 30 and routed to water treatment facilities. Heater 18 heats the crude oil to reduce the viscosity and allow the water droplets to descend faster with the desalter vessel 26 and this is especially important for high viscous crudes which tend to be the heavier crudes.

In a first stage of mixing at mixing valve 20, mixing is controlled by adjusting the size of the opening gap between the globe and the valve seat within the valve 20. A high flow rate through a very small gap creates very high shear forces. High shear generates very small water droplets that are dispersed in the oil continuum. Very small droplets create a lot of contact area between the salt in the oil and the wash water. The salt tends to rapidly dissolve in the water if the salts are in close contact with the wash water, even if the contact is fairly brief. However, if the shear forces are excessive, the wash water and crude oil can create a stable emulsion which is difficult to separate. The desalter vessel 26 is not designed to break stable emulsions and thus the valve 20 must be adjusted to obtain high salt removal without creating an emulsion that will allow both salt and water to go out of the desalter vessel 26 with the crude oil. If water goes out with the crude, when heated in subsequent separation and processing steps, the salts dissolved in water can hydrolyze into hydrochloric acid which is highly corrosive.

If the mixing is too gentle, the water droplets are too large and the desalting is less effective because of reduced contact between the salt molecules and water droplets. Thus, there is an optimum range of droplet size to obtain highly effective desalting of the crude oil. In the second stage of mixing after the mixing valve 20, further mixing of a mixed stream of crude oil and wash water in intermediate conduit 36 exiting the mixing valve 20 may be accomplished.

As shown in this invention, by using moderate shear rates, coalescence of droplets may be accomplished after the mixing valve 20 or 120. The desire is to mix the wash water with the crude oil so that as much salt may be dissolved into the wash water as possible while also increasing the average droplet size so that fewer very small droplets enter the desalter vessel 26. Thus, water droplets within the mixed stream of crude oil and wash water in conduit 36 exiting mixing valve 20 are smaller, on average, than the water droplets within the mixed stream of crude oil and water in conduit 32 exiting the coalescer mixer 24. While a two-step, two-stage, sequential strategy is described in conjunction with FIG. 2, more than two steps may be involved such that a multitude of mixing devices are installed and fluidly connected in series. In such an arrangement, ensuring that mixing energy decreases in subsequent downstream steps with the last mixing step having the lowest mixing energy is believed to result in the most complete and most efficient removal of water and salts from desalted crude in conduit 28 exiting desalter vessel 26. The brine or effluent water exiting through drain 30 at the bottom of the desalter vessel 26 may be routed to water treatment facilities.

Before going on to the description of a second embodiment, it should be recognized that the electric field applied to the oil/water mixture prior to it entering the desalter vessel 26 further enhances coalescence of water droplets. While electric fields are known for enhancing separation of oil in water, in the present invention, the electric field is applied while the oil/water mixture is moving in the coalescer mixer 24 or in the conduit one either side 32 and/or 36 of the coalescer mixer 24. It is believed that in this location that the dipole forces act in a more useful manner than in a large settling vessel. Dipole forces are most effective when two water droplets are at a short separation distance. The water droplets have to be close to each other for dipole forces to come to play in enhancing coalescence. So, while the water droplets are enjoying moderate turbulence and coming into close proximity, the dipole forces are synergistic in that they increase the coalescence of droplets while in close proximity that is caused or increased due to the turbulence. In essence, it is believed that the coalescer mixer 24 creates macro turbulence that may be optimized and the dipole forces create micro turbulence that together increases the likelihood that any particular collision results in coalescence. The synergy is not limited to the coalescer mixer 24 as there is turbulence in the coalescer mixer 24 and on either side of the coalescer mixer 24.

The micro turbulence that results from the use of combined AC/DC electrostatic technologies (referred to as Dual Polarity Technology) is preferred in that it provides higher removal efficiency of small water droplets from the crude oil. The AC/DC combination provides a weaker AC field between the grounded water phase and the electrode plates. The DC field is contained within the electrode area and provides a much stronger voltage gradient than the AC field. The DC field promotes electrophoresis—electrically charged water droplets that can move transversely between the electrode plates and this provides the water droplets with many more collision opportunities. Thus, the DC field is capable of coalescing the small water droplets escaping the AC field. Further options include modulated electrostatic fields, improved electrode configurations as well as improved fluid distribution inside the electrostatic dehydrators.

Figure 3:
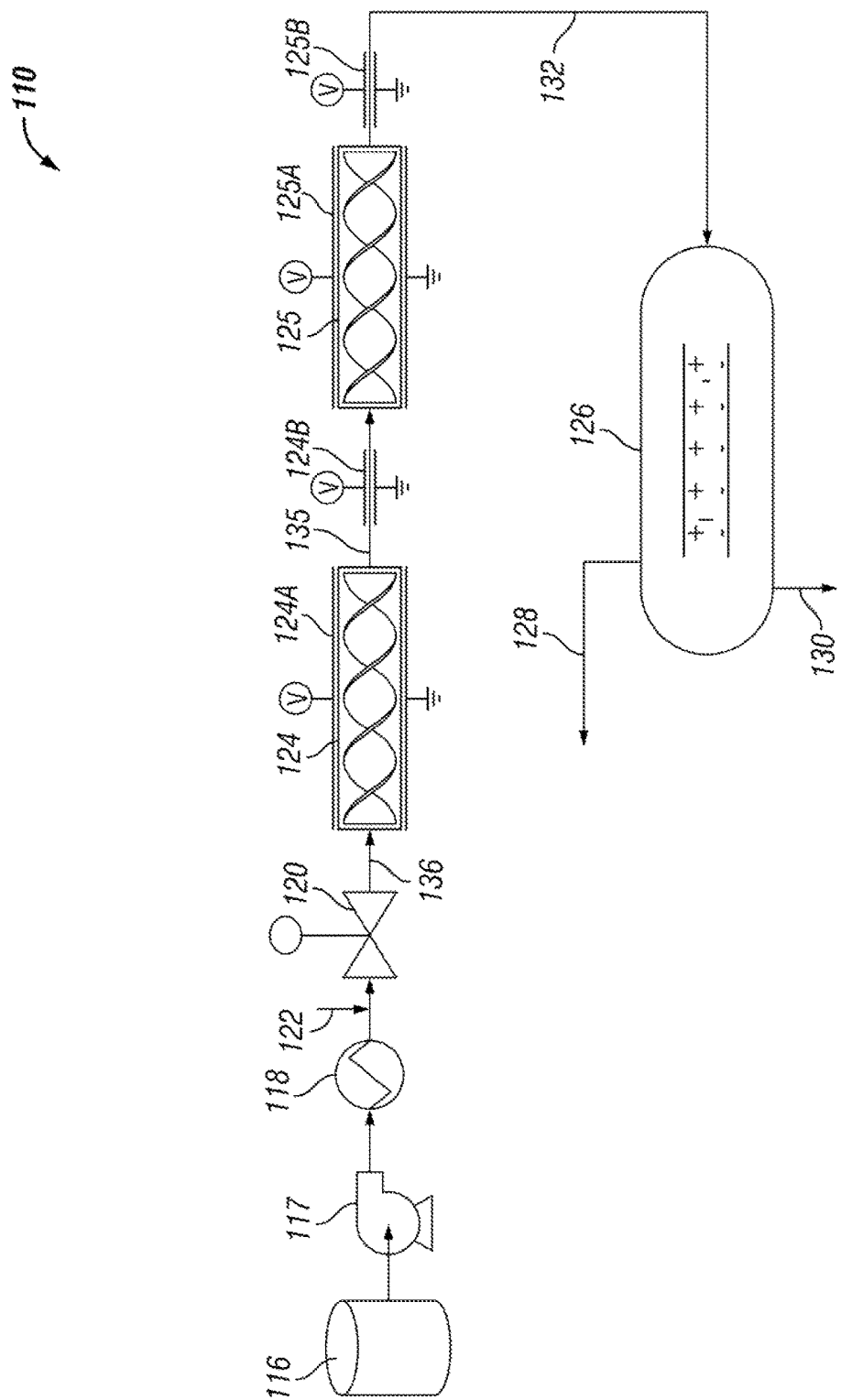
FIG. 3 is a schematic diagram of a second embodiment of a crude oil desalting apparatus in accordance with the present invention.
Figure 8:
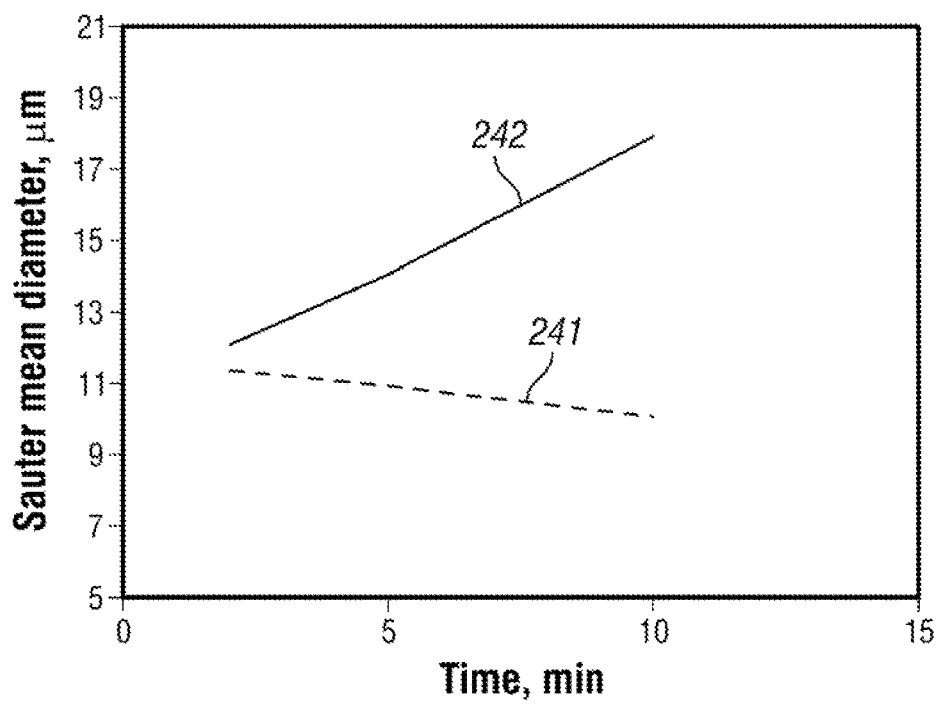
FIG. 8 is a graph showing two mixers operating on the same mixture of oil and water wherein one mixer is primarily coalescing drops and the other is primarily breaking drops.

An alternative arrangement is shown in FIG. 3 where crude oil in storage tank 116 is pumped by pump 117 to heater 118. Wash water is added to the crude oil at inlet 122 and the wash water and crude oil are carried to mixer valve 120 where the wash water and crude oil are subjected to considerable shear forces sufficient to get much of the salt in the oil dissolved into the wash water. The mixed stream of wash water and oil is then subjected to a first coalescer 124 and then a second coalescer 125. Also shown are field generators 124A, 124B, 125A and 125B. It should be noted that more than two successive coalescers may be arranged in sequence. The coalesced stream of crude oil and wash water is then directed to the desalter vessel 126 where desalted crude go out the overhead and on to further processing such as crude oil refining and the wash water exits the drain. It is preferred that the second coalescer mixer has less severe mixing than in the first coalescer mixer so as to avoid breaking up any larger water droplets created upstream in either the first coalescer mixer 124 or in conduit 135 provided with a field generator 124B.

It should be noted that the residence time within the coalescers or mixers 24, 124 and 125 is on the order of seconds from about 1 second to about 5 seconds each while the residence time within the desalter vessel is minutes and may be 10 minutes to 240 minutes with 60 minutes being fairly standard for a conventional desalter system. If the coalescers are optimized, it is logical that residence time in the desalter vessel 26 and 126 may be reduced with comparable or better dehydration rates. It is estimated that one barrel of water uses the heat required to distill up to seven barrels of crude oil. Clearly, minimizing water being carried out of the overhead 128 improves energy utilization in the crude furnace. Additionally, better dehydration reduces the amount of salts that can hydrolyze and cause acid corrosion in downstream equipment.

Carrying on with the description of systems that may efficiently desalt crude oil, in FIG. 4 is shown a helical blade 210 that may be used in a coalescer or mixer 24, 124 or 125. The helical blade 210 fits into a tube or pipe of comparable diameter to stir the mixture of wash water and crude oil as the stream progresses through a coalescer or mixer 24, 124 or 125. The idea is to bring droplets into close proximity to collide with one another to coalesce into larger droplets. If the relative speed of the collisions becomes excessive, it is believed that two droplets may collide and form three or more droplets, so creating a gentle mixing leads to favorable results.

In FIG. 5, a segmented helical blade 220 is shown with a plurality of helical blade segments 222, 223, 224, 225, 226, and 227. The segmented helical blade 220 is a fixed internal element of the coalescer mixer and, like the helical blade 210, the segmented helical blade 220 fits inside a pipe of comparable diameter. The pipe and blade 220 may be of equal diameter to the conduit 36 or may have a larger diameter to slow the mixed stream of wash water and oil to reduce the energy inputted into the stream and allow for longer residence time in the static mixer 24, 124 and 125. Residence time in the coalescer mixer 24, 124 and 125 will depend on the rate through the conduit 36 and 136, but may be adjusted through length and diameter selections. It is anticipated that the diameter of the coalescer or mixer will be equal to or larger than the conduit 36 and have a standard length. Segmented helical blades are used for mixing materials, typically fairly viscous materials. As such, lower cost for the crude oil desalter system in current test systems has been obtained by using regularly manufactured equipment that is intended for a different purpose.

Each of the segments 222-227 can have common segment length and common flight angle. Each segment 222-227, as shown, turns the crude oil and wash water 180 degrees as the crude oil and wash water flow along the length of the coalescer mixer 24, 124 and 125. Reducing the length of the segment while maintaining the 180 degree twist increases the angle of the blade across the flow path of the stream through the coalescer mixer 24, 124 and 125. However, there are many variables to use in optimizing operations. As shown in FIG. 6, the offset angle between two adjacent segments may be established at 90 degrees or about 90 degrees. As shown in FIG. 7, the offset angle between two segments may be 45 degrees or about 45 degrees. Static mixers with fixed elements having an offset of 90 degrees and 45 degrees are available for mixing and blending and have been used in tests for model oil (Isopar V) and wash water downstream of a mixing valve. It is believed that these static mixers would likely reduce the average water droplet size or especially reduce the number and size of the larger drops if the wash water and crude oil had not already been subjected to the high shear mixing at mixing valve 20 or 120. However with very small droplets exiting the mixing valve 20 or 120, and using available static mixers as coalescing mixers downstream of the mixing valve 120, the arrangement where a first coalescer mixer having 90 degree offset and the second having a 45 degree offset appears to provide very encouraging results. Clearly, differing offset angles in adjacent coalescer mixers would provide one mode of optimizing. Having differing offset angles between segments within a single coalescer mixer provides a second design option. Differing segment lengths, differing flight angles, differing velocity by changing the radial dimension of the pipe forming the coalescer mixer, and differing residence time are among a number of other design alternatives for optimizing coalescing.

As noted above, the coalescer mixer is a mixer, but it is operated in a coalescing mixing regime. For an example of the same mixer operating in a breaking mixing regime and under differing conditions operating in a coalescing mixing regime, consider FIG. 8 where three processes are compared. As shown at line 241 in FIG. 8, when an emulsion of crude oil and wash water is subject to a blender mixer at 2000 rpm for ten minutes, the droplet mean diameter, as measured by the Sauter method, decreases slightly over 10 minutes. This experiment was performed using Merey crude oil that was diluted with 14% xylene to reduce the viscosity and then homogenized by a Glas-Col bench-top shaker for at least 20 minutes before use. The wash water is de-ionized (DI) water and twenty (20) ppm of demulsifier 23262 from Baker Petrolite was added to the oil.

So, as compared to line 241, when the same blender mixer is operated at 200 rpm using the same oil/water mixture over the same time frame, the mean droplet size increases significantly as shown at line 242. The water droplets in the emulsion is actually coalescing in a mixer at the slower rpm where the droplets are breaking at the higher rpm. As such, it is seen that in general, coalescing mixing occurs where less mixing energy is imposed on the mixture. However, the number of variables that are involved with mixing makes it so that only by testing and measuring can it be known whether a specific mixing procedure will be coalescing or breaking.

To maintain valid comparisons, the Merey crude oil, diluted with xylene and added demulsifier, and DI water were held in a water bath at 195° F. for 30 min and mixed with a Chandler Engineering mixer-blender to prepare each emulsion. Water droplet size distribution was measured using the Malvern Mastersizer immediately after preparing the emulsion and thereafter at regular time intervals. The emulsions were used for batch tests, which is described below, as soon as possible. It was confirmed that there was no loss of water in the blend cup and that separation was achieved only in the Portable Electrostatic Dehydrator tubes.

Figure 9:
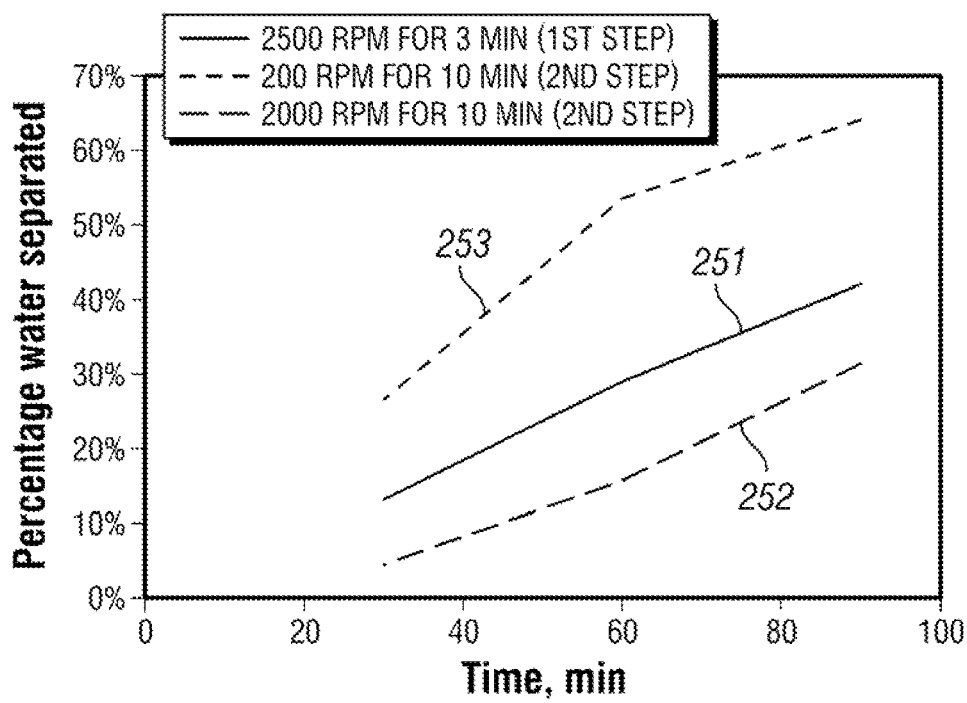
FIG. 9 is a graph showing water separated based on two-stage mixing at different mixing regimes.

Referring now to FIG. 9, the importance of the size of the water droplets is shown. Line 251 shows the percentage of water separated from the crude oil over time after having been mixed at 2500 rpm for 3 minutes. Line 252 shows the separation effectiveness for crude oil and wash water having been mixed in a first period for 3 minutes at 2500 rpm and then for 10 minutes at 2000 rpm. Clearly, the separation by settling is much less effective for this two-step mixer process than simply allowing the crude oil and water to enter a settling vessel after the first stage of mixing. In comparison, line 253 shows the settling effectiveness for a two stage mixing where the crude oil and wash water are mixed for 3 minutes at 2500 rpm and then mixed from 10 minutes at 200 rpm. The line shows significantly higher water separation than simply allowing the mixed crude oil and wash water after the first stage. The second stage of mixing apparently caused the water droplets to coalesce into larger droplets that are much more easily separated in a settling vessel from the crude oil.

Figure 10:
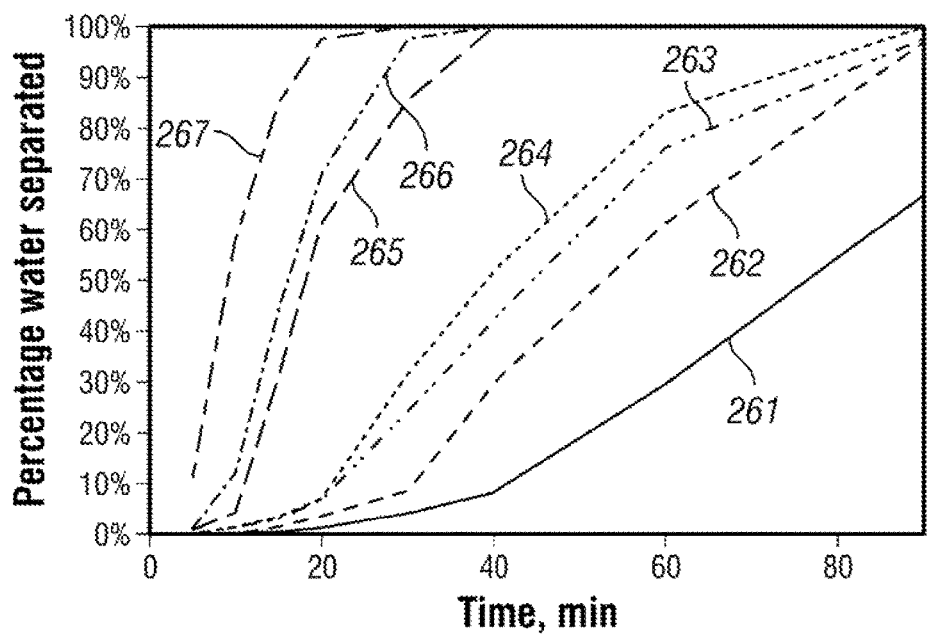
FIG. 10 is a graph showing water separation over time for water in crude oil emulsion samples where each sample has a different average diameter (Sauter Mean Diameter) of the water drops dispersed in the crude oil.

The point is further shown in FIG. 10 where seven crude oil and wash water emulsion samples are separated in a settling vessel. Each of the samples has a different mean water droplet diameter called the Sauter mean diameter. Line 261 shows the percentage separation over time for a sample having a mean diameter of 13.7 µm. Line 262 shows the separation for a sample having a mean diameter of 16.2 µm while line 263 shows the separation for a sample having a mean diameter of 30.5 µm. Line 264 shows separation for a sample having a mean diameter of 25.8 µm while line 265 shows the separation for a sample having a mean diameter of 48.6 µm and line 266 shows the separation for a sample having a mean diameter of 37.5 µm. The sample with the largest mean diameter of 70.5 µm enjoyed the most rapid and complete separation of water from the crude oil as shown by line 267.

Figure 11:
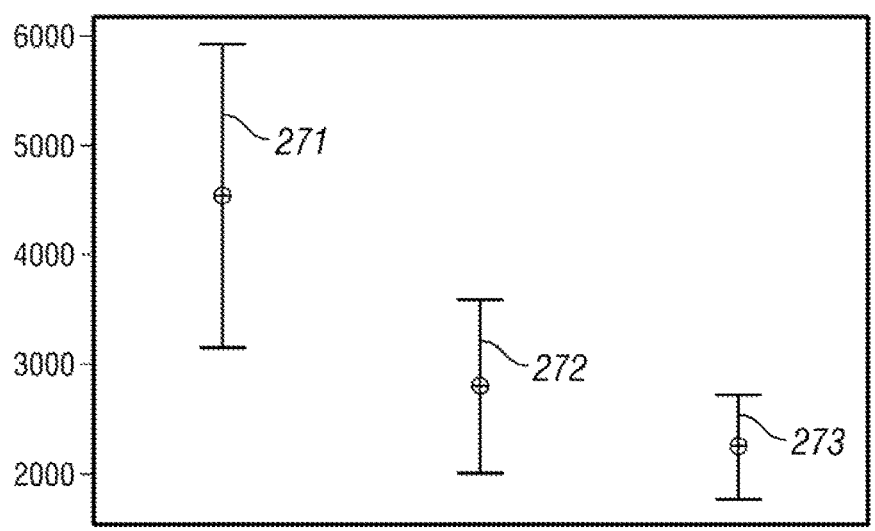
FIG. 11 is a graph showing water carryover for a base case without a coalescer or mixer downstream of the mixer valve along with two example cases of the present invention.
Figure 12:
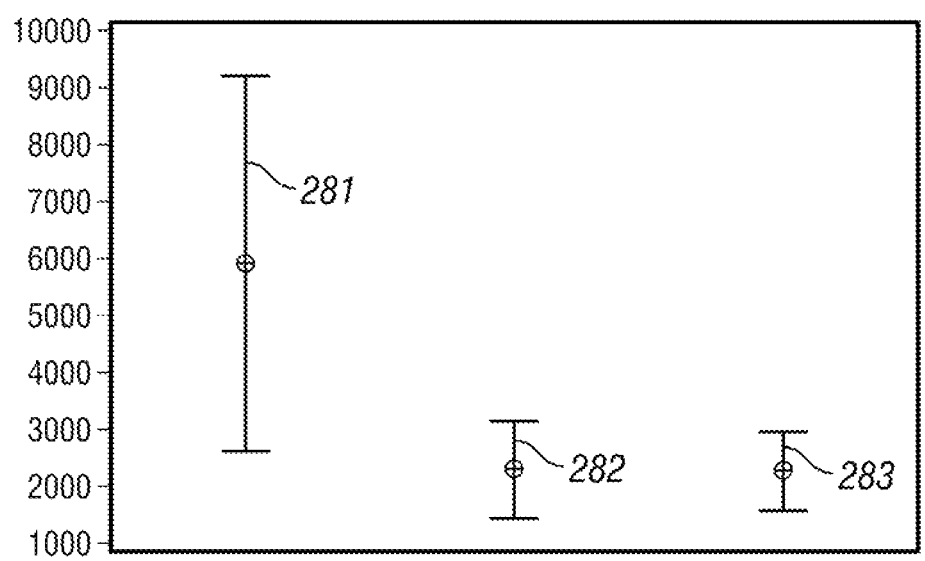
FIG. 12 is a graph showing water carryover for a base case without a coalescer or mixer downstream of the mixer valve along with two example cases of the present invention where the mixer valve has a larger pressure drop and therefore will have water droplets of smaller average diameter dispersed in the oil.
Figure 13:
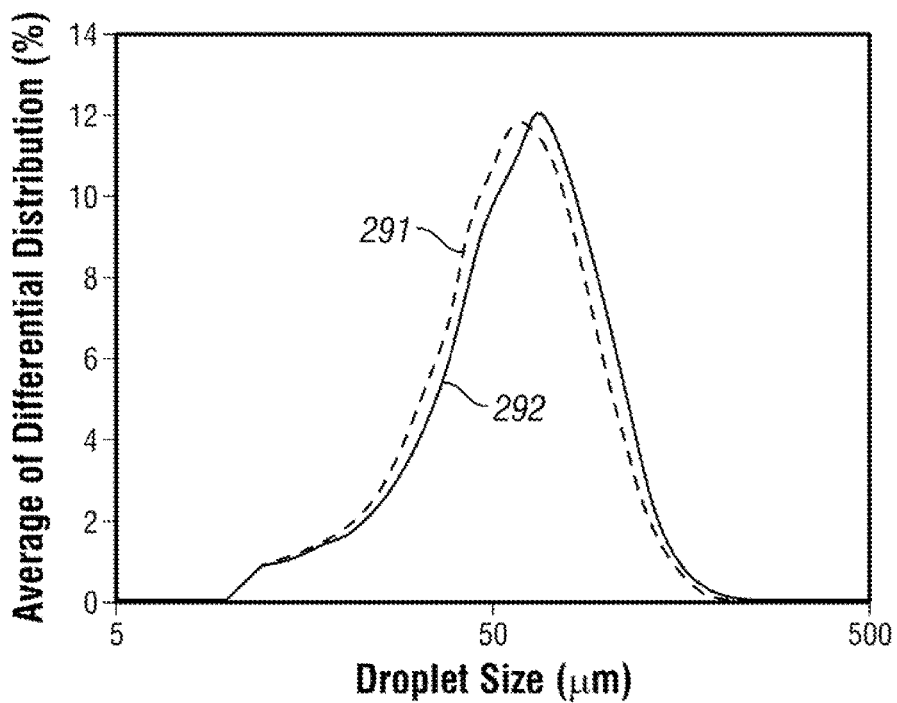
FIG. 13 is a graph depicting drop size distributions immediately following the mixer valve and just prior to the desalter vessel without a coalescer or mixer in between and where the pressure drop across the mixer valve is 18 psi.
Figure 14:
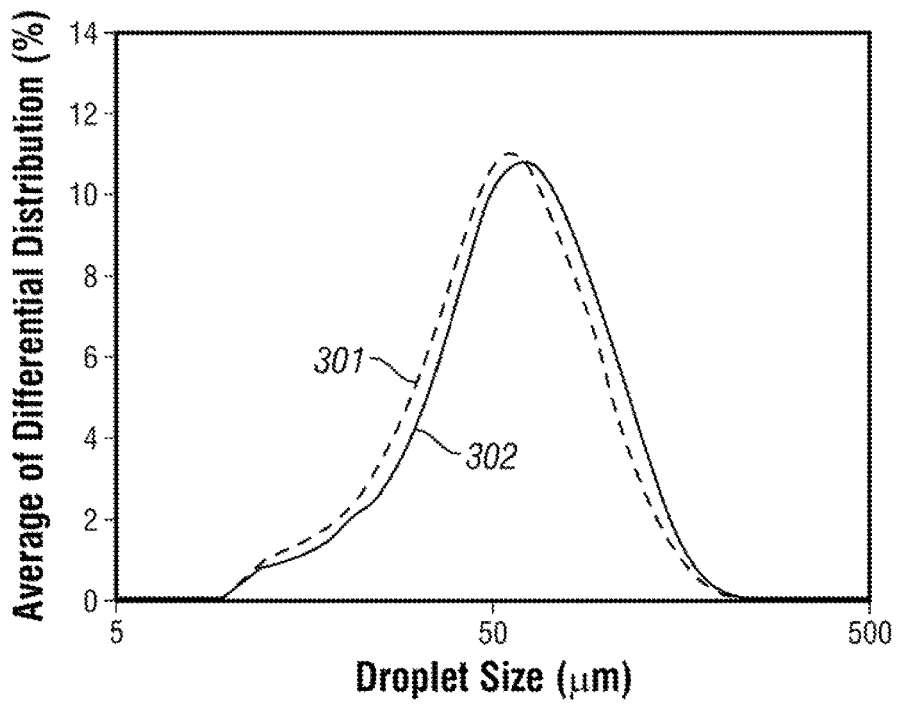
FIG. 14 is a graph depicting drop size distributions immediately following the mixer valve and just prior to the desalter vessel with a single 45 degree segmented helical mixer in between the mixer valve and the desalter vessel and where the pressure drop across the mixer valve is 18 psi.
Figure 15:
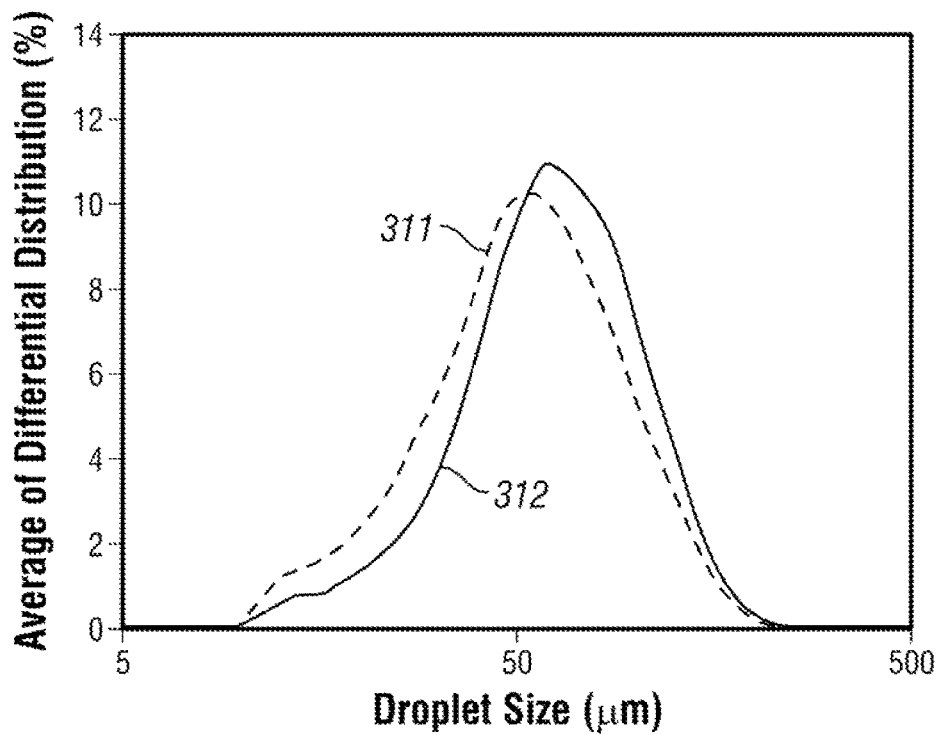
FIG. 15 is a graph depicting drop size distributions immediately following the mixer valve and just prior to the desalter vessel with 90 degree segmented helical mixer followed by 45 degree segmented helical coalescer in between the mixer valve and the desalter vessel and where the pressure drop across the mixer valve is 18 psi.

Turning to FIGS. 11 and 12, tests were run with model oil (Isopar V) and wash water through a mixing valve at a pressure drop of 18 psi and 24 psi, respectively. In FIG. 11, the first bar 271 shows the ppm concentration water carryover in the oil from a conventional arrangement desalter settling vessel with a mixing valve set at 18 psi. The dot in the middle of the bar 271 shows the mean with the end points showing the 95% confidence interval. The second bar 272 shows a single static coalescer mixer downstream of the mixing valve and upstream of the settling vessel where the coalescer mixer has a segmented helical blade with 45 degree offsets between adjacent segments. It should be noted that the carryover has been quite reduced. The bar 273 shows the water carryover for a second inventive arrangement where a first static coalescer mixer has a segmented helical blade with 90 degree offsets between the segments followed by a second static coalescer mixer with a segmented helical blade having 45 degree offsets between adjacent segments. It is noteworthy that with 95% confidence the second embodiment of the inventive system performs in the worst case better than the conventional system in its best case.

Turning to FIG. 12, bars 281, 282 and 283 are comparable to what is shown in FIG. 11 except that the pressure drop across the mixing valve is 24 psi. With the higher pressure drop, it is expected that smaller droplets will form in the mixing valve and more water carryover will likely occur. But similarly, the worst cases for the inventive systems only have as much carryover as the best cases in the conventional system.

Figure 16:
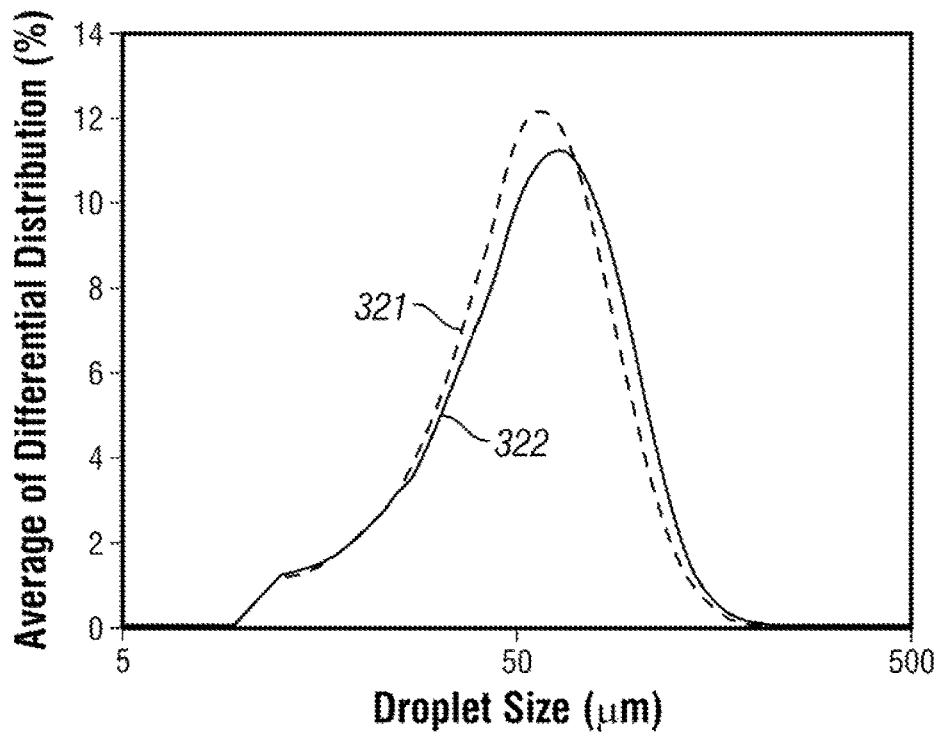
FIG. 16 is a graph depicting drop size distributions immediately following the mixer valve and just prior to the desalter vessel without a coalescer or mixer in between and where the pressure drop across the mixer valve is 24 psi.
Figure 17:
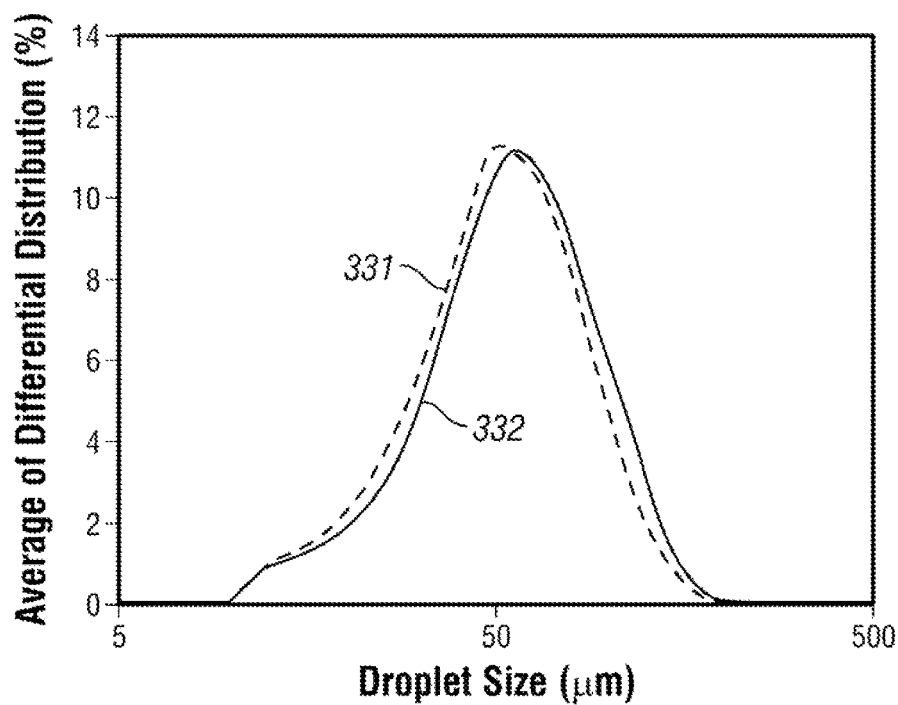
FIG. 17 is a graph depicting drop size distributions immediately following the mixer valve and just prior to the desalter vessel with a single 45 degree segmented helical mixer in between the mixer valve and the desalter vessel where the pressure drop across the mixer valve is 24 psi and where the pressure drop across the mixer valve is 24 psi.
Figure 18:
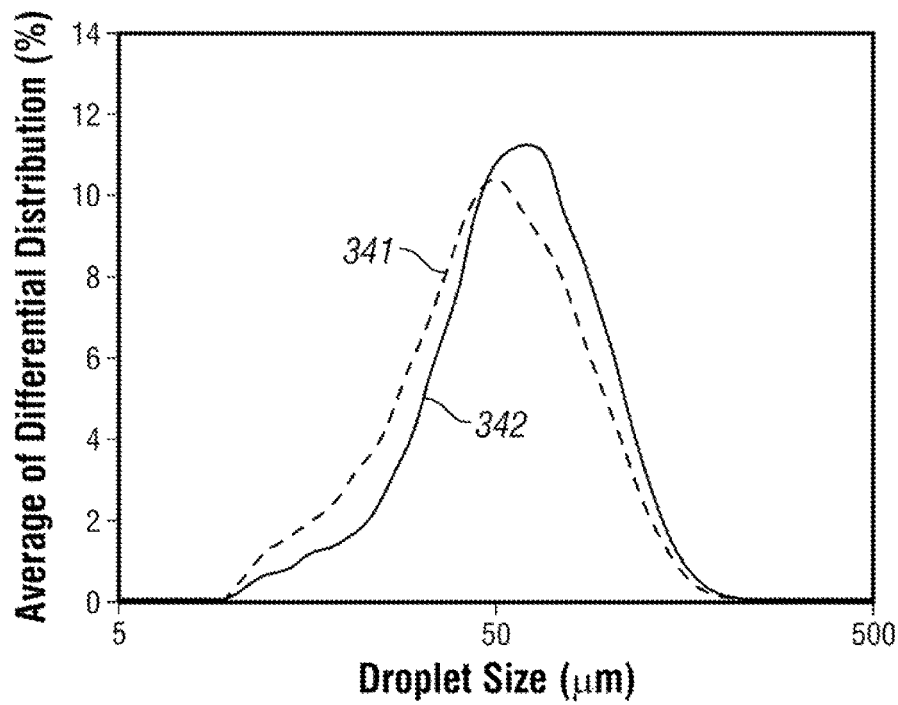
FIG. 18 is a graph depicting drop size distributions immediately following the mixer valve and just prior to the desalter vessel with 90 degree segmented helical mixer followed by 45 degree segmented helical coalescer in between the mixer valve and the desalter vessel where the pressure drop across the mixer valve is 24 psi and where the pressure drop across the mixer valve is 24 psi.

FIGS. 13, 14, 15, 16, 17, and 18 present the results from the same tests in FIGS. 11 and 12 more particularly showing the entire droplet diameter distribution as measured by optical microscopy. Focusing first on FIG. 13, line 291 shows the droplet diameter distribution immediately after the mixing valve 20 or 120 while the line 292 shows the droplet diameter distribution just before the crude oil and wash water enters the settling vessel. While there is some coalescence of the droplets, consider FIG. 14 and especially FIG. 15 where line 302 is spaced from line 301 at the left slope of the curve. This shows that the smaller droplets are coalescing. It is more pronounced in FIG. 15 where line 312 is more significantly spaced to the right along the left slope. It is the smallest droplets that are most likely to be carried over with the crude oil. FIGS. 16, 17 and 18 show similar results for 24 psi pressure drop across the mixing valve. Again, lines 322 and 321 are close together showing a small amount of coalescing while there is more space between lines 332 and 331 and even more space between lines 342 and 341 in FIG. 18. For the configuration having 90 and 45 degree offset mixers in series, the number of droplets of small sizes (from 7 to 20 µm) has been shown to be reduced by about 35% on average.

Figure 19:
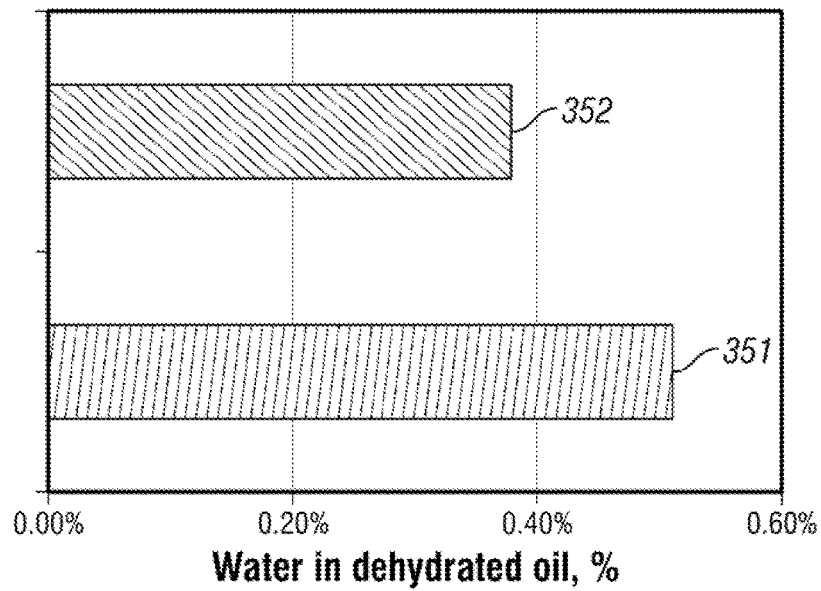
FIG. 19 is a graph showing a comparison of water carryover for a conventional system and with an embodiment of the present invention.

As shown in FIG. 19, the percentage of water in the dehydrated oil is shown to be 0.51% in a conventional desalter vessel (26 or 126) while using the embodiment with two successive static mixers as described with 90 degree offsets first and 45 degree offsets second, the percentage of water in the dehydrated oil was reduced to 0.38%. These water percentages were estimated by using a population balance mathematical model to simulate a conventional desalter vessel (26 or 126) and a desalter according to the present invention. This 20% improvement provides reduced water in the oil which saves corrosion hazards in downstream systems along with improved energy efficiency and also provides more separation capability for handling the heavier crudes that are believed to be produced in the future.

Figure 20:
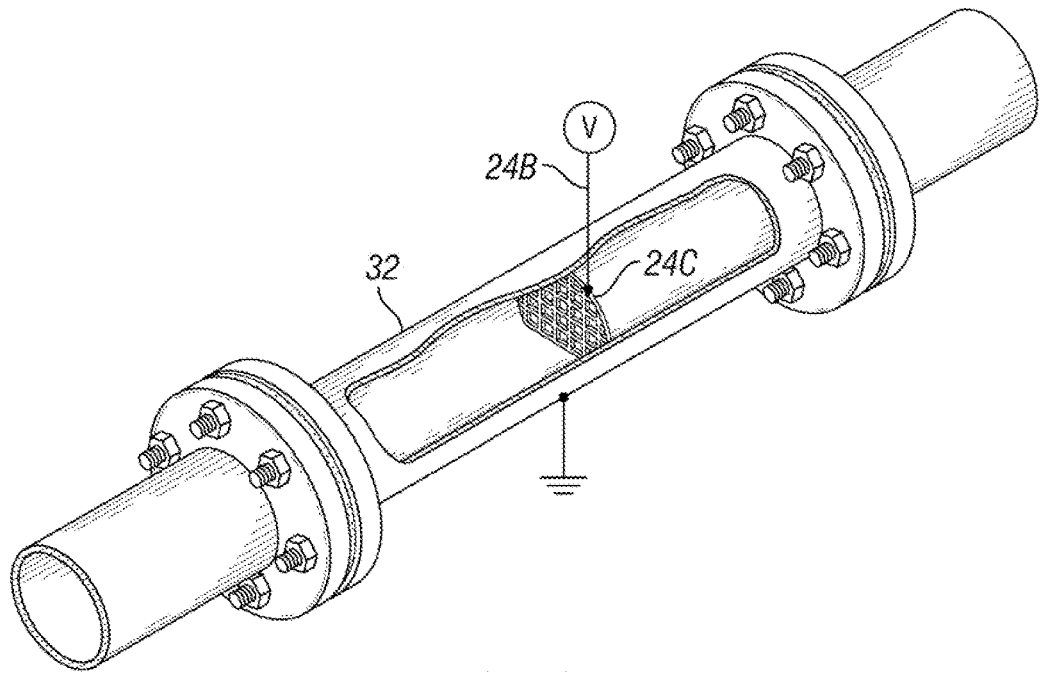
FIG. 20 is a fragmentary perspective view of a portion of the present invention illustrating the application of an electric field to the mixture of oil and water moving along the conduit.
Figure 21:
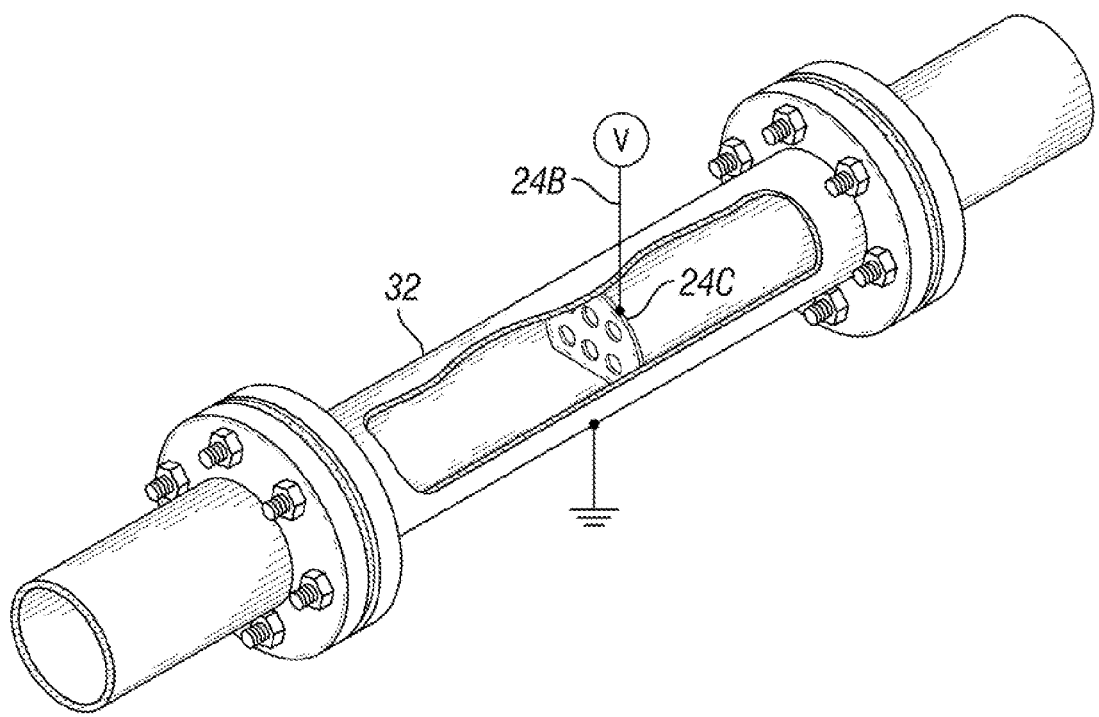
FIG. 21 is a fragmentary perspective view of an alternative embodiment of a portion of the present invention illustrating the application of an electric field to the mixture of oil and water moving along the conduit.
Figure 22:
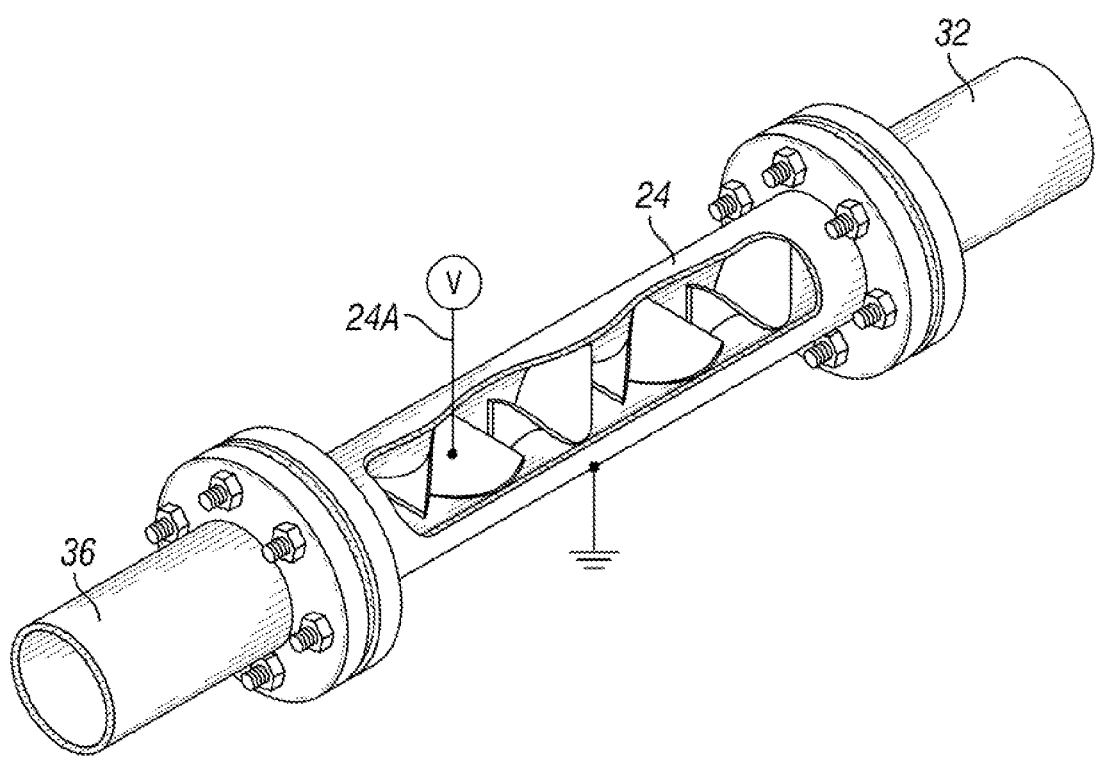
FIG. 22 is fragmentary perspective view of a portion of the present invention illustrating the application of an electric field to the mixture of oil and water moving along a coalescer mixer.

Example field generators 24A, 24B, 124A, 124B, 125A, 125B are better illustrated in FIGS. 20-22. In FIG. 20, a plate with many holes is shown to allow the oil and water to pass through is electrified by the voltage source while the conduit is grounded. The flanges and other equipment are provided with electric insulators to maintain the field within the conduit 32. It should be noted that the plate 24C does not extend to the bottom of conduit 32 so as not to impede the flow of water droplets that have separated from the oil and descended to the bottom of the conduit. It is preferred that the droplets not be subjected to forces that might break them up so that they may be readily separated in the desalter vessel 26. In FIG. 21, the plate 24C is shown with much larger holes and the same flat lower portion so as not to interfere with water droplets moving along the bottom of the conduit 32.

In FIG. 22, the voltage source is connected to the static mixer blade blades while the conduit or housing is grounded. Like the embodiments shown in FIGS. 20 and 21, the coalescer mixer includes insulators at the flanges and internal equipment to electrically isolate the field charge within the coalescer mixer.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A desalting system for desalting crude oil comprising:
 a mixing valve for mixing crude oil with wash water causing at least a portion of the salt in the crude oil to dissolve into the wash water forming desalted crude oil and salty wash water;
 a heater upstream of the mixing valve;
 at least one feed conduit for conveying a stream of crude oil and wash water to the mixing valve;
 a static mixer;
 a first intermediate conduit for delivering crude oil and wash water from the mixing valve to the static mixer;
 a desalter vessel for separating desalted crude oil from salty wash water;
 a coalesced conduit for delivering crude oil and wash water from the static mixer to the desalter vessel;
 a second static mixer spaced from and downstream of the first static mixer and connected by a second intermediate conduit and wherein the second static mixer is arranged to impose less harsh mixing on the crude oil and water mixture than the first static mixer is arranged to impose wherein the coalesced conduit is arranged between the second static mixer and the desalter vessel; and
 electric field generators arranged to apply an electric field over crude oil and wash water in said first static mixer, in said second static mixer and over the second intermediate conduit;
 further including the electric fields are dual polarity electric fields that include both an AC and a DC field to the crude oil and wash water.

2. The desalter system according to claim 1 wherein the static mixer comprises a single, continuous helical blade.

3. The desalter system according to claim 1 wherein the static mixer comprises a series of helical blade segments wherein each segment is aligned on the same axis, but offset from the adjacent segments by a degree of rotation about the axis.

4. The desalter system according to claim 3 wherein each segment is offset by less than 50 degrees from the adjacent segments.

5. The desalter system according to claim 3 wherein each segment is offset by about 90 degrees from the adjacent segments.

6. The desalter system according to claim 3 wherein each segment is a helix that twists about 180 degrees.

7. The desalter system according to claim 3 wherein each segment is a helix that twists about 360 degrees.

8. The desalter system according to claim 3 wherein each segment is a helix that twists between 90 degrees and 270 degrees.

9. The desalter system according to claim 3 wherein each segment is a helix with a flight angle and the flight angle of at least one segment is different than the flight angle of a separate segment.

10. The desalter system according to claim 1 wherein the static mixer has a diameter that is larger than the diameter of the first intermediate conduit such that the velocity through the static mixer is slower than through the intermediate conduit.

11. The desalter system according to claim 1 wherein the electric field is applied to the oil and water mixture in at least one conduit with a generally transverse plate having a shape that avoids interfering with water droplets moving along the bottom of the conduit.

* * * * *